United States Patent
Yeh et al.

(10) Patent No.: US 10,630,881 B2
(45) Date of Patent: Apr. 21, 2020

(54) LENS DETECTION METHOD AND LENS DETECTION SYSTEM USED FOR DETECTING TYPE OF EXTERNALLY CONNECTED LENS

(71) Applicant: VIVOTEK INC., New Taipei (TW)

(72) Inventors: Chien-Ming Yeh, New Taipei (TW); Ting-Chia Chang, New Taipei (TW); Ren-Wei Lin, New Taipei (TW); Wen-Yuan Li, New Taipei (TW)

(73) Assignee: VIVOTEK INC., New Taipei (TW)

(*) Notice: Subject to any disclaimer, the term of this patent is extended or adjusted under 35 U.S.C. 154(b) by 6 days.

(21) Appl. No.: 16/226,669

(22) Filed: Dec. 20, 2018

(65) Prior Publication Data

US 2019/0199911 A1 Jun. 27, 2019

(30) Foreign Application Priority Data

Dec. 27, 2017 (TW) .............................. 106146065 A (51) Int. Cl.
*H04N 5/232* (2006.01)
*G08B 13/196* (2006.01)

(52) U.S. Cl.
CPC ... *H04N 5/23209* (2013.01); *G08B 13/19619* (2013.01); *G08B 13/19626* (2013.01)

(58) Field of Classification Search
CPC .......... H04N 5/23209; G08B 13/19619; G08B 13/19626
See application file for complete search history.

(56) References Cited

U.S. PATENT DOCUMENTS

| | | | | |
|---|---|---|---|---|
| 4,855,814 A | * | 8/1989 | Shiraishi | H04N 5/23209 348/224.1 |
| 2004/0202464 A1 | * | 10/2004 | Miyasaka | G03B 7/26 396/529 |
| 2009/0143099 A1 | * | 6/2009 | Kang | G03B 17/14 455/556.1 |
| 2010/0110217 A1 | * | 5/2010 | Shibuno | H04N 5/23209 348/222.1 |
| 2014/0022434 A1 | * | 1/2014 | Morita | H04N 5/2353 348/333.04 |
| 2019/0306412 A1 | * | 10/2019 | Imamura | H04N 5/225 |

* cited by examiner

*Primary Examiner* — Lin Ye
*Assistant Examiner* — Chriss S Yoder, III
(74) *Attorney, Agent, or Firm* — Winston Hsu (57) ABSTRACT

A lens detection system includes a system chip, and the system chip includes a first lens selection pin and a protocol path pin. A lens detection method includes performing a reset step by the system chip; enabling the first lens selection pin by the system chip; detecting a first lens identification code via the protocol path pin by the system chip; loading first lens data by the system chip and entering a first lens operation mode for controlling an externally connected first lens if the first lens identification code is detected; and disabling the first lens selection pin by the system chip if the first lens identification code is undetected.

13 Claims, 5 Drawing Sheets

LENS DETECTION METHOD AND LENS DETECTION SYSTEM USED FOR DETECTING TYPE OF EXTERNALLY CONNECTED LENS

BACKGROUND OF THE INVENTION

1. Field of the Invention

The invention relates to a lens detection method and a lens detection system, and more particularly, a lens detection method and a lens detection system used for detecting a type of an externally connected lens by means of a system chip.

2. Description of the Prior Art

With the increasing demand for security surveillance, surveillance cameras that support network communications are becoming more and more popular. In the field of surveillance camera, a surveillance camera device can now support the installation of many types of lenses. For example, Precise IRIS (P-IRIS) lens, direct-current IRIS (DC-IRIS) lens and intelligent CS-mount lens are common used types of lenses. Each of these three types of lenses can be coupled to a connector of the main body of a monitoring camera, but the circuitry design inside the lenses are different, and the operations such as aperture control operations are also different. Therefore, when the connector on the main body of the monitoring camera is coupled to a lens, it is difficult for the control circuit to confirm the type of the connected lens. If the lens type is incorrectly detected, it may cause an erroneous operation or damage of the device.

In order to solve the above problem, for example, a user can set the control circuit manually according to the type of a lens for subsequent operations after coupling the lens. However, such a control method will cause inconvenience in use and it is difficult to ensure correctness. Therefore, there is still a need for a better solution in the field to improve the convenience and correctness of use.

SUMMARY OF THE INVENTION

An embodiment provides a lens detection method used for a lens detection system. The lens detection system includes a system chip. The system chip includes a first lens selection pin and a protocol path pin. The lens detection method includes performing a reset step by the system chip; enabling the first lens selection pin by the system chip; detecting a first lens identification code via the protocol path pin by the system chip; loading first lens data by the system chip and entering a first lens operation mode for controlling an externally connected first lens if the first lens identification code is detected; and disabling the first lens selection pin by the system chip if the first lens identification code is undetected.

An embodiment provides a lens detection system including a system chip, a connector and a first switch. The system chip includes a first lens selection pin and a protocol path pin. The connector is used to connect an external lens and includes a first connection port, a second connection port, a third connection port and a fourth connection port. The first switch includes a first terminal coupled to the second connection port of the connector, a second terminal coupled to the fourth connection port of the connector, a third terminal coupled to the first lens selection pin of the system chip, and a fourth terminal coupled to the protocol path pin of the system chip. The system chip is used to enable the first lens selection pin and determine whether the protocol path pin receives a first lens identification code. The first lens identification code is generated and sent to the system chip from the fourth terminal of the first switch when a loop is formed by the external lens and the second connection port and the fourth connection port of the connector. When system chip receives the first lens identification code, the system chip loads first lens data and enters a first lens operation mode for controlling a first lens. When the system chip fails to receive the first lens identification code, the system chip disables the first lens selection pin.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
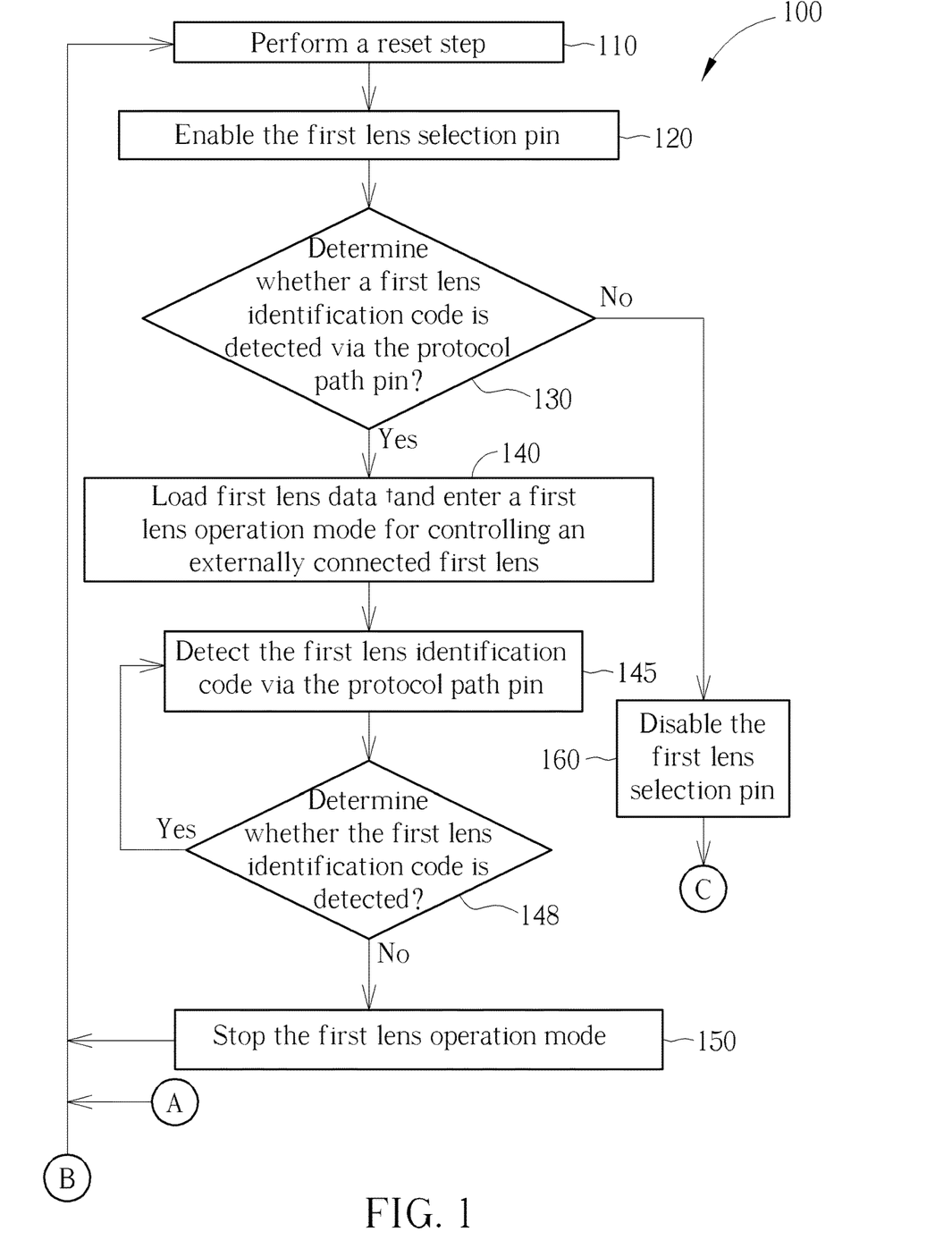
FIG. 1 and FIG. 2 illustrate a flowchart of a lens detection method according to an embodiment.
Figure 2:
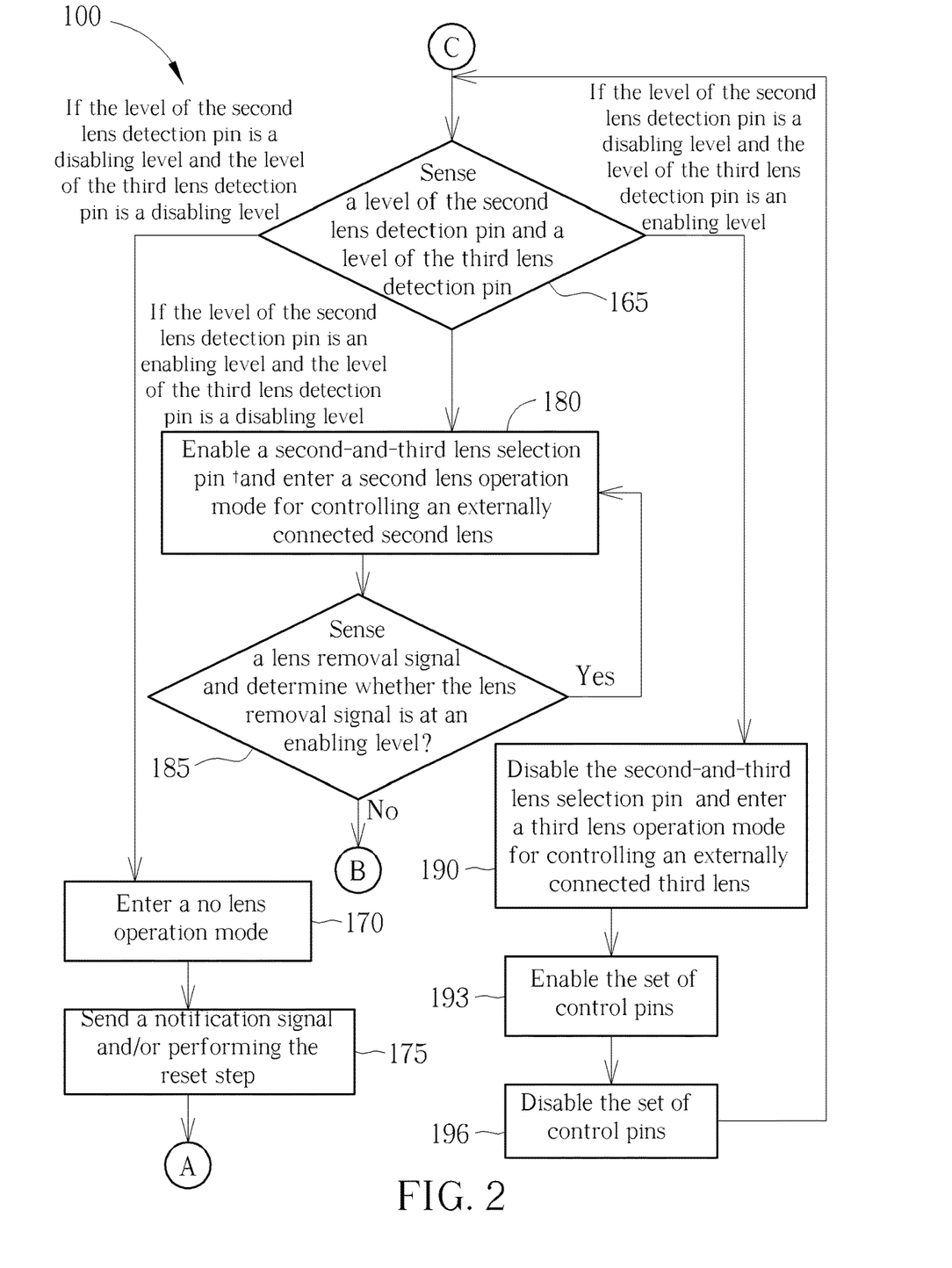
Figure 3:
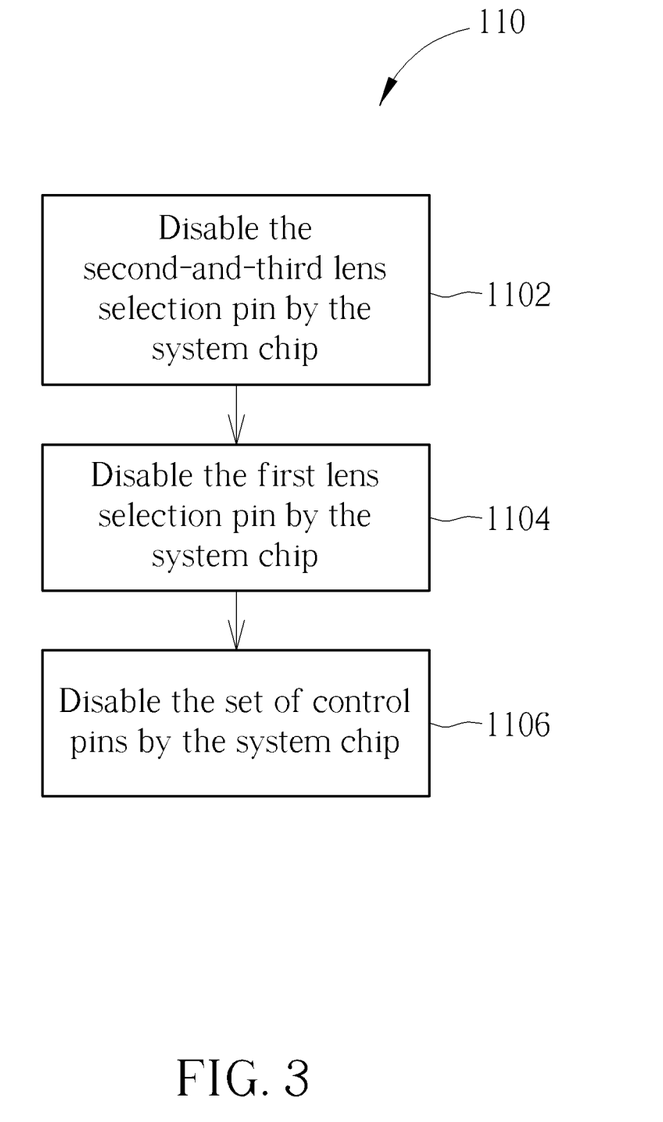
FIG. 3 illustrates a flowchart of performing the reset step of the lens detection method of FIG. 1.
Figure 4:
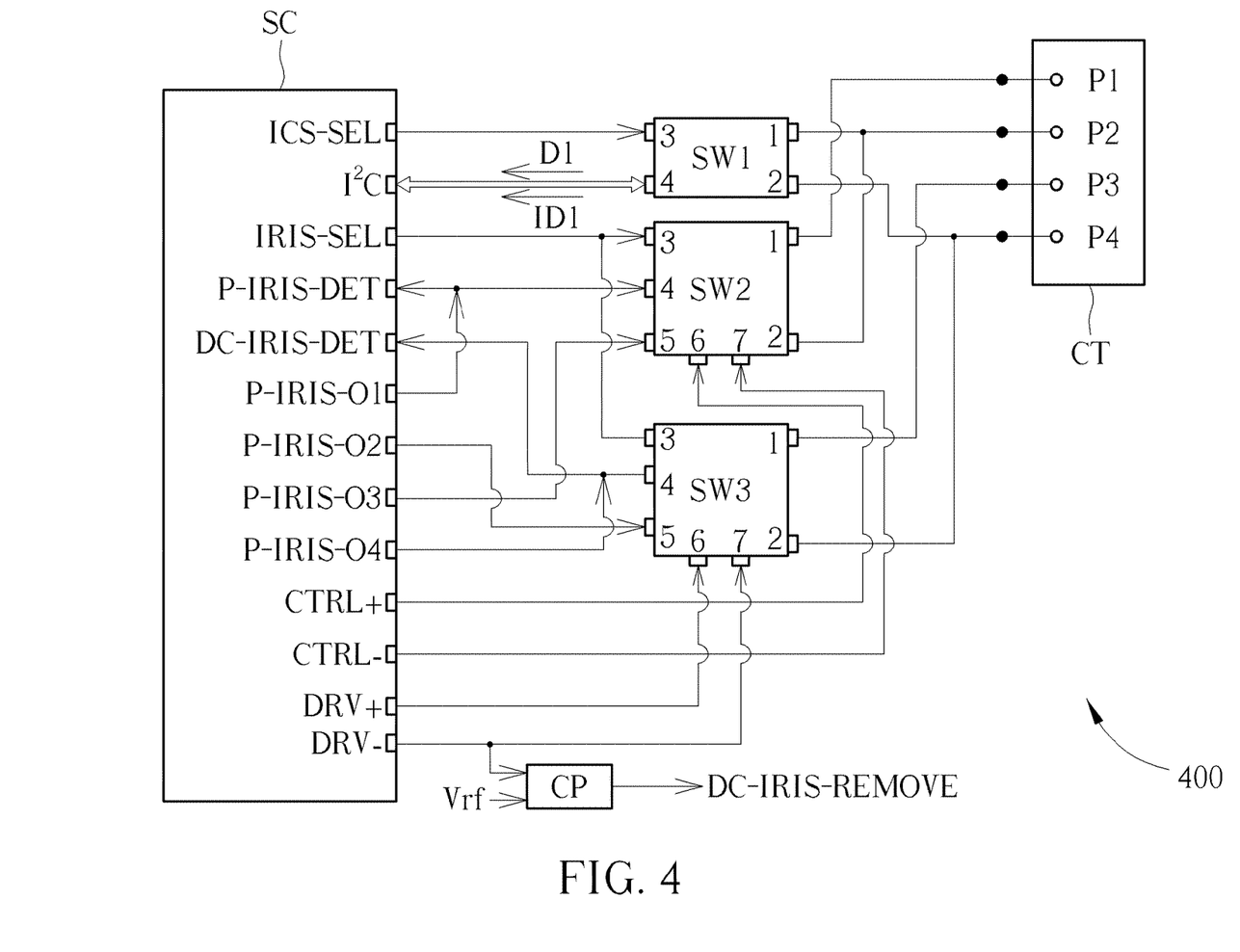
FIG. 4 illustrates a lens detection system according to an embodiment.

FIG. 1 and FIG. 2 illustrate a flowchart of a lens detection method 100 according to an embodiment. FIG. 3 illustrates a flowchart of Step 110 of the lens detection method 100. FIG. 4 illustrates a lens detection system 400 according to an embodiment. In the following description, a first lens may be an ICS lens, a second lens may be a DC-IRIS lens, and a third lens may be a P-IRIS lens. In the following description, enabling a pin may be converting a level of the pin to an enabling level, and disabling a pin may be converting a level of the pin to a disabling level. An enabling level may be (but not limited to) a level of 1, and a disabling level may be (but not limited to) a level of 0. The lens detection method 100 shown in FIG. 1 and FIG. 2 may be applied for the lens detection system 400. As shown in FIG. 1 to FIG. 4, the lens detection method 100 may include the following steps.

Step 110: perform a reset step by the system chip SC;

Step 120: enable the first lens selection pin ICS-SEL by the system chip SC;

Step 130: determine whether a first lens identification code ID1 is detected via the protocol path pin I²C by the system chip SC; if so, enter Step 140; else, enter Step 160;

Step 140: load first lens data by the system chip SC and enter a first lens operation mode for controlling an externally connected first lens;

Step 145: detect the first lens identification code ID1 via the protocol path pin I²C by the system chip SC;

Step 148: determine whether the first lens identification code ID1 is detected; if so, enter Step 145; else, enter Step 150;

Step 150: stop the first lens operation mode; enter Step 110;

Step 160: disable the first lens selection pin ICS-SEL by the system chip SC;

Step 165: sense a level of the second lens detection pin DC-IRIS-DET and a level of the third lens detection pin P-IRIS-DET by the system chip SC; if the level of the second lens detection pin DC-IRIS-DET is a disabling level and the level of the third lens detection pin P-IRIS-DET is a disabling level; enter Step 170; if the level of the second lens detection pin DC-IRIS-DET is an enabling level and the level of the third lens detection pin P-IRIS-DET is a disabling level; enter Step 180; if the level of the second lens detection pin DC-IRIS-DET is a disabling level and the level of the third lens detection pin P-IRIS-DET is an enabling level; enter Step 190;

Step 170: enter a no lens operation mode by the system chip SC;

Step 175: send a notification signal and/or performing the reset step by the system chip SC; enter Step 110;

Step 180: enable a second-and-third lens selection pin IRIS-SEL by the system chip SC and enter a second lens operation mode for controlling an externally connected second lens;

Step 185: sense a lens removal signal DC-IRIS-REMOVE by the system chip SC and determine whether the lens removal signal DC-IRIS-REMOVE is at an enabling level; if so, enter Step 180; else, enter Step 110;

Step 190: disable the second-and-third lens selection pin IRIS-SEL by the system chip SC and enter a third lens operation mode for controlling an externally connected third lens;

Step 193: enable the set of control pins P-IRIS-O1 to P-IRIS-O4 by the system chip SC; and Step 196: disable the set of control pins P-IRIS-O1 to P-IRIS-O4 by the system chip SC; enter Step 165.

In Step 110, the reset step is performed by the system chip SC to make a surveillance camera device enter a detection lens mode. In Step 120, the first lens selection pin ICS-SEL is enabled by the system chip SC to make the surveillance camera device operate under a mode of detecting an Intelligent CS-mount lens. In Step 148, the first lens identification code ID1 may be detected by polling to check whether the first lens is still coupled. In Step 175, the notification signal may be sent through an interface such as a website page or an application program (e.g. a visual interface of mobile app installed on a mobile device) to notify a user. In Step 185, when the lens removal signal DC-IRIS-REMOVE is converted from the enabling level to a disabling level, it may be determined that the externally connected second lens is removed. In Step 193, when the set of control pins P-IRIS-O1 to P-IRIS-O4 are enabled, each of a first connection P1 to a fourth connection port P4 of a connector CT may be set to a low level. In Step 196, when the set of control pins P-IRIS-O1 to P-IRIS-O4 are disabled, each of a first connection P1 to a fourth connection port P4 may be set to a high-Z level. In Step 190, after entering the third lens operation mode, an aperture of the externally connected third lens may be adjusted through the control pins P-IRIS-O1 to P-IRIS-O4. In Step 193, the control pins P-IRIS-O1 to P-IRIS-O4 may be enabled to set an aperture control stepper motor of a P-IRIS lens to a non-excitation state. In Step 196, the control pins P-IRIS-O1 to P-IRIS-O4 may be disabled to set an aperture of the P-IRIS lens back to an initial state corresponding to a state before the lens is operated.

FIG. 3 illustrates a flowchart of Step 100 of the lens detection method 110. In Step 110, performing the reset step by the system chip SC may include the following steps to set a surveillance camera device enter a detection lens mode.

Step 1102: disable the second-and-third lens selection pin IRIS-SEL by the system chip SC;

Step 1104: disable the first lens selection pin ICS-SEL by the system chip SC; and Step 1106: disable the set of control pins P-IRIS-O1 to P-IRIS-O4 by the system chip SC.

As shown in FIG. 4, the lens detection system 400 may include the system chip SC, the connector CT, a first switch SW1, a second switch SW2 and a third switch SW3. The system chip SC may include the first lens selection pin ICS-SEL and the protocol path pin I²C. The connector CT may be used to connect an external lens and include the first connection port P1, the second connection port P2, the third connection port P3 and the fourth connection port P4. As shown in FIG. 4, a first terminal of each of the first switch SW1 to the third switch SW3 may be denoted as "1", a second terminal of each of the first switch SW1 to the third switch SW3 may be denoted as "2", and so on. Regarding the first switch SW1, a first terminal may be coupled to the second connection port P2, a second terminal coupled to the fourth connection port P4, a third terminal may be coupled to the first lens selection pin ICS-SEL and a fourth terminal may be coupled to the protocol path pin I²C. The system chip SC may be used to enable the first lens selection pin ICS-SEL and determine whether the protocol path pin I²C receives the first lens identification code ID1. The first lens identification code ID1 may be generated and sent to the system chip SC from the fourth terminal of the first switch SW1 when a loop is formed by the external lens and the second connection port P2 and the fourth connection port P4.

When the system chip SC receives the first lens identification code ID1, the system chip SC may load the first lens data D1 and enter the first lens operation mode for controlling the first lens. When the system chip SC fails to receive the first lens identification code ID1, the system chip SC may disable the first lens selection pin ICS-SEL, for example, by setting a level of the first lens selection pin ICS-SEL to a level of 0.

As shown in FIG. 4, regarding the second switch SW2, a first terminal may be coupled to the first connection port P1, a second terminal may be coupled to the second connection port P2, a third terminal may be coupled to a second-and-third lens selection pin IRIS-SEL of the system chip SC, and a fourth terminal may be coupled to a third lens detection pin P-IRIS-DET of the system chip SC. Regarding third switch SW3, a first terminal may be coupled to the third connection port P3, a second terminal may be coupled to the fourth connection port P4, a third terminal may be coupled to the second-and-third lens selection pin IRIS-SEL, and a fourth terminal may be coupled to the second lens detection pin DC-IRIS-DET of the system chip SC.

After disabling the first lens selection pin ICS-SEL by the system chip SC (e.g. Step 160), if a loop is formed by an external lens coupled to the connector CT and the first connection port P1 and the second connection port P2 so that a level of the fourth terminal of the second switch SW and a level of the third lens detection pin P-IRIS-DET of the system chip SC are enabling levels and a level of the fourth terminal of the third switch SW3 and a level of the second lens detection pin DC-IRIS-DET of the system chip SC are disabling levels (e.g. the pin P-IRIS-DET having a level of 1 and the pin DC-IRIS-DET having a level of 0), the system chip SC may determine the external lens is a third lens, and the system chip SC may disable the second-and-third lens selection pin IRIS-SEL and enter the third lens operation mode for controlling the externally connected third lens. As shown in FIG. 4, the system chip SC may further include the control pins P-IRIS-O1 to P-IRIS-O4. The control pin P-IRIS-O1 may be coupled to the fourth terminal of the second switch SW2. The control pin P-IRIS-O2 may be coupled to a fifth terminal of the third switch SW3. The control pin P-IRIS-O3 may be coupled to a fifth terminal of the second switch SW2. The control pin P-IRIS-O4 may be coupled to the fourth terminal of the third switch SW3. After the system chip SC enters the third lens operation mode, the system chip SC may control a third lens through the control pins P-IRIS-O1 to P-IRIS-O4, the second switch SW2, the third switch SW3 and the connector CT.

Under another scenario, after the system chip SC disables the first lens selection pin ICS-SEL (e.g. Step 160), if a loop is formed by the external lens and the third connection port P3 and the fourth connection port P4 of the connector CT so that a level of the fourth terminal of the second switch SW2 and the level of the third lens detection pin P-IRIS-DET of the system chip SC are disabling levels and a level of the fourth terminal of the third switch and a level of the second lens detection pin DC-IRIS-DET of the system chip SC are enabling levels (e.g. the pin P-IRIS-DET having a level of 0 and the pin DC-IRIS-DET having a level of 1), the system chip SC may determine the external lens is a second lens (e.g. a DC-IRIS lens), and the system chip SC may enable the second-and-third lens selection pin IRIS-SEL and enter a second lens operation mode for controlling the externally connected second lens.

As shown in FIG. 4, the system chip SC may further include a positive control pin CTRL+, a negative control pin CTRL−, a positive driving pin DRV+ and a negative driving pin DRV−. The positive control pin CTRL+ may be coupled to a sixth terminal of the second switch SW2. The negative control pin CTRL+ may be coupled to a seventh terminal of the second switch SW2. The positive driving pin DRV+ may be coupled to a sixth terminal of the third switch SW3. The negative driving pin DRV− may be coupled to a seventh terminal of the third switch SW3. In the second lens operation mode, the system chip SC may control the second lens through the positive control pin CTRL+, the negative control pin CTRL+, the positive driving pin DRV+, the negative driving pin DRV−, the second switch SW2, the third switch SW3 and the connector CT.

As shown in FIG. 4, the lens detection system 400 may include a comparator 400 used to compare a level of the negative driving pin DRV− with a reference level Vrf to generate the lens removal signal DC-IRIS-REMOVE. The comparator CP may include a first terminal, a second terminal and an output terminal where the first terminal is coupled to the negative driving pin DRV− of the system chip SC, the second terminal receives the reference level Vrf, and the output terminal is used to output the lens removal signal DC-IRIS-REMOVE. When a surveillance camera device is in the second lens operation mode and the system chip SC detects the lens removal signal DC-IRIS-REMOVE, the level of the negative driving pin DRV− may be converted to a disabling level from an enabling level, and it may be determined that the second lens has been removed. The system chip SC may then perform a reset step to make the surveillance camera device enter the detection lens mode.

Figure 5:
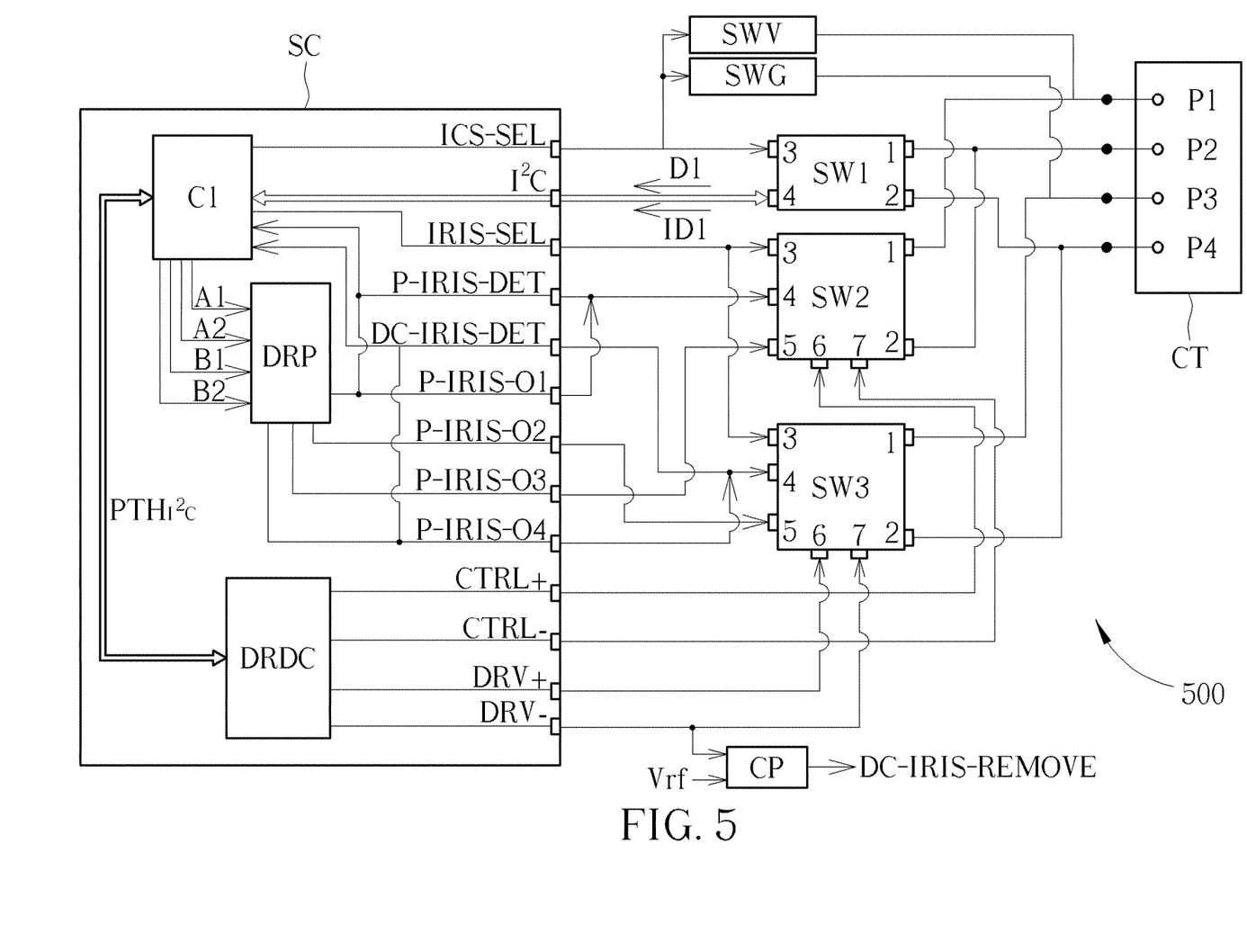
FIG. 5 illustrates a lens detection system of FIG. 4 according to an embodiment.

FIG. 5 illustrates a lens detection system 500 according to an embodiment. The lens detection system 500 may be a structure of the lens detection system 400 of FIG. 4. As shown in FIG. 5, the system chip SC may include a driver unit DRDC, a driver unit DRP and a circuit unit C1. The driver unit DRDC may provide output signals to the positive control pin CTRL+, the negative control pin CTRL−, the positive driving pin DRV+ and the negative driving pin DRV− for controlling a second lens (e.g. a DC-IRIS lens). The driver unit DRP may provide output signals to the control pins P-IRIS-O1 to P-IRIS-O4 for controlling a third lens (e.g. a P-IRIS lens). The circuit unit C1 may include a circuit with control functions. The circuit unit C1 and the driver unit DRDC may be coupled to one another through a protocol path $PTH_{I^2C}$. The circuit unit C1 may control the driver unit DRDC through the protocol path $PTH_{I^2C}$. The circuit unit C1 and the fourth terminal of the first switch SW1 may be coupled to one another through the protocol path pin $I^2C$ for transmitting the abovementioned the lens identification code ID1 and the first lens data D1. The protocol path $PTH_{I^2C}$ and the path between the protocol path pin $I^2C$ and the fourth terminal of the first switch SW1 may be designed by complying with Inter-Integrated Circuit protocol ($I^2C$ protocol). The circuit unit C1 may control the driver unit DRP through control paths A1, A2, B1 and B2. As shown in FIG. 5, the lens detection system 500 may include power switches SWV and SWG, where the power switch SWV may be used to control a power supply path, and the power switch SWG may be used to control a ground connection path.

The abovementioned first switch SW1 to the third switch SW3 may be (but not limited to) single pole double throw (SPDT) switches. The circuit unit C1 may be a system on chip (SoC).

By means of the abovementioned lens detection method and lens detection system, after an external lens is connected to a connector, the type of the lens may be automatically determined, and type of the lens may be detected, and control signals corresponding to the lens may be transmitted. Hence, convenience may be improved, and it may avoid burning an external lens caused by having the hardware and software in a surveillance camera mismatch the external lens. It may also prevent erroneous controls damaging the lens or causing undesirable operations. Therefore, the present application is useful for reducing technical problems in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lens detection method used for a lens detection system, the lens detection system comprising a system chip, the system chip comprising a first lens selection pin and a protocol path pin, the lens detection method comprising:
    performing a reset step by the system chip;
    enabling the first lens selection pin by the system chip;
    detecting a first lens identification code via the protocol path pin by the system chip;
    loading first lens data by the system chip and entering a first lens operation mode for controlling an externally connected first lens if the first lens identification code is detected; and
    disabling the first lens selection pin by the system chip if the first lens identification code is undetected.

2. The method of claim 1, wherein after entering the first lens operation mode, the method further comprises:
    detecting the first lens identification code again via the protocol path pin by the system chip; and
    stopping the first lens operation mode and performing the reset step by the system chip if the first lens identification code is not detected again by the system chip.

3. The method of claim 1, wherein the system chip further comprises a second lens detection pin, a third lens detection pin and a second-and-third lens selection pin, and after disabling the first lens selection pin, the method further comprises:

sensing a level of the second lens detection pin and a level of the third lens detection pin by the system chip;

enabling the second-and-third lens selection pin by the system chip and entering a second lens operation mode for controlling an externally connected second lens if the level of the second lens detection pin is an enabling level and the level of the third lens detection pin is a disabling level; and sensing a lens removal signal by the system chip;

wherein the reset step is performed by the system chip when the lens removal signal is converted to a disabling level.

4. The method of claim 1, wherein the system chip further comprises a second lens detection pin, a third lens detection pin and a second-and-third lens selection pin, and after disabling the first lens selection pin, the method further comprises:

sensing a level of the second lens detection pin and a level of the third lens detection pin by the system chip; and disabling the second-and-third lens selection pin by the system chip and entering a third lens operation mode for controlling an externally connected third lens if the level of the second lens detection pin is a disabling level and the level of the third lens detection pin is an enabling level.

5. The method of claim 4, wherein the system chip further comprises a set of control pins, and after entering the third lens operation mode for adjusting the externally connected third lens, the method further comprises:

enabling the set of control pins by the system chip; and
disabling the set of control pins by the system chip.

6. The method of claim 1, wherein the system chip further comprises a second lens detection pin, a third lens detection pin and a second-and-third lens selection pin, and after disabling the first lens selection pin, the method further comprises:

sensing a level of the second lens detection pin and a level of the third lens detection pin by the system chip;

sending a notification signal or performing the reset step by the system chip if the level of the second lens detection pin is a disabling level and the level of the third lens detection pin is a disabling level.

7. The method of claim 1, wherein the system chip further comprises a second-and-third lens selection pin and a set of control pins, and performing the reset step by the system chip comprises:

disabling the second-and-third lens selection pin by the system chip;

disabling the first lens selection pin by the system chip; and disabling the set of control pins by the system chip.

8. A lens detection system comprising:

a system chip comprising a first lens selection pin and a protocol path pin;

a connector configured to connect an external lens and comprising a first connection port, a second connection port, a third connection port and a fourth connection port; and a first switch comprising a first terminal coupled to the second connection port of the connector, a second terminal coupled to the fourth connection port of the connector, a third terminal coupled to the first lens selection pin of the system chip, and a fourth terminal coupled to the protocol path pin of the system chip;

wherein:

the system chip is configured to enable the first lens selection pin and determine whether the protocol path pin receives a first lens identification code, and the first lens identification code is generated and sent to the system chip from the fourth terminal of the first switch when a loop is formed by the external lens and the second connection port and the fourth connection port of the connector;

when system chip receives the first lens identification code, the system chip loads first lens data and enters a first lens operation mode for controlling a first lens; and when the system chip fails to receive the first lens identification code, the system chip disables the first lens selection pin.

9. The lens detection system of claim 8, wherein the lens detection system further comprises:

a second switch comprising a first terminal coupled to the first connection port of the connector, a second terminal coupled to the second connection port of the connector, a third terminal coupled to a second-and-third lens selection pin of the system chip, and a fourth terminal coupled to a third lens detection pin of the system chip; and a third switch comprising a first terminal coupled to the third connection port of the connector, a second terminal coupled to the fourth connection port of the connector, a third terminal coupled to the second-and-third lens selection pin of the system chip, and a fourth terminal coupled to a second lens detection pin of the system chip;

wherein the system chip is configured to disable the second-and-third lens selection pin and enter a third lens operation mode for controlling an externally connected third lens when the first lens selection pin is disabled by the system chip and a loop is formed by the external lens and the first connection port and the second connection port of the connector so that a level of the fourth terminal of the second switch and a level of the third lens detection pin of the system chip are enabling levels and a level of the fourth terminal of the third switch and a level of the second lens detection pin of the system chip are disabling levels.

10. The lens detection system of claim 9, wherein the system chip further comprises a first control pin coupled to the fourth terminal of the second switch, a second control pin coupled to a fifth terminal of the third switch, a third control pin coupled to a fifth terminal of the second switch, and a fourth control pin coupled to the fourth terminal of the third switch;

wherein the system chip is further configured to control the third lens through the first control pin to the fourth control pin, the second switch, the third switch and the connector.

11. The lens detection system of claim 8, wherein the lens detection system further comprises:

a second switch comprising a first terminal coupled to the first connection port of the connector, a second terminal coupled to the second connection port of the connector, a third terminal coupled to a second-and-third lens selection pin of the system chip, and a fourth terminal coupled to a third lens detection pin of the system chip; and a third switch comprising a first terminal coupled to the third connection port of the connector, a second terminal coupled to the fourth connection port of the connector, a third terminal coupled to the second-and-third lens selection pin of the system chip, and a fourth terminal coupled to a second lens detection pin of the system chip;

wherein the system chip is configured to enable the second-and-third lens selection pin and enter a second lens operation mode for controlling an externally connected second lens when the first lens selection pin is disabled by the system chip and a loop is formed by the external lens and the third connection port and the fourth connection port of the connector so that a level of the fourth terminal of the second switch and a level of the third lens detection pin of the system chip are disabling levels and a level of the fourth terminal of the third switch and a level of the second lens detection pin of the system chip are enabling levels.

12. The lens detection system of claim 11, wherein the system chip further comprises a positive control pin coupled to a sixth terminal of the second switch, a negative control pin coupled to a seventh terminal of the second switch, a positive driving pin coupled to a sixth terminal of the third switch, and a negative driving pin coupled to a seventh terminal of the third switch; wherein the system chip is further configured to control the second lens through the positive control pin, the negative control pin, the positive driving pin, the negative driving pin, the second switch, the third switch and the connector.

13. The lens detection system of claim 12, wherein the lens detection system further comprises a comparator configured to compare a level of the negative driving pin with a reference level to generate a lens removal signal, and the comparator comprises:
- a first terminal coupled to the negative driving pin of the system chip;
- a second terminal configured to receive the reference level; and
- an output terminal configured to output the lens removal signal;
- wherein the system chip is further configured to adjust the level of the negative driving pin to convert the lens removal signal to an enabling level when the level of the second lens detection pin of the system chip is converted to a disabling level.

* * * * *